United States Patent [19]

Rilly et al.

[11] Patent Number: 4,987,525
[45] Date of Patent: Jan. 22, 1991

[54] SWITCHING POWER SUPPLY

[75] Inventors: Gerard Rilly, Unterkirnach; Daniel Lopez, Königsfeld, both of France

[73] Assignee: Electronic-Werke Deutschland GmbH, Villingen-Schwenningen, Fed. Rep. of Germany

[21] Appl. No.: 498,663

[22] Filed: Mar. 26, 1990

Relate U.S. Application Data

[63] Continuation of PCT EP88/00857 filed Sept. 22, 1988.

[30] Foreign Application Priority Data

Sep. 22, 1988 [WO] PCT Int'l Appl. ............... 88/00857

[51] Int. Cl.$^5$ ............................................ H02M 3/335
[52] U.S. Cl. .................................... 363/21; 363/97; 315/411; 358/190
[58] Field of Search ................................... 363/19–21, 363/95, 97, 131; 315/411; 358/190

[56] References Cited

U.S. PATENT DOCUMENTS

| 4,073,003 | 2/1978 | Chambers | 363/21 |
| 4,245,180 | 1/1981 | Rilly et al. | 315/411 |
| 4,316,127 | 2/1982 | Lamoureux | 315/408 |
| 4,466,051 | 8/1984 | Fitzgerald | 363/21 |
| 4,623,960 | 11/1986 | Eng | 363/21 |
| 4,692,852 | 9/1987 | Hoover | 358/190 |
| 4,710,859 | 12/1987 | Rilly | 363/97 |
| 4,766,528 | 8/1988 | Marinus | 363/21 |
| 4,864,481 | 9/1989 | Osman | 315/411 |

FOREIGN PATENT DOCUMENTS 2910593 9/1980 Fed. Rep. of Germany .
0090085 10/1983 Fed. Rep. of Germany .
0211300 2/1987 Fed. Rep. of Germany .

Primary Examiner—Peter S. Wong
Attorney, Agent, or Firm—Joseph S. Tripoli; Joseph J. Laks; Sammy S. Henig

[57] ABSTRACT

A switching power supply includes a switching transistor coupled to a winding of a first transformer for generating a collector current. The collector current is coupled in a current path that includes that winding and a primary winding of a power transformer. The collector current is coupled to the base of the switching transistor via the first transformer such that when the switching transistor is conductive, both the collector current and a base current of the transistor are upramping. When the transistor is nonconductive, a horizontal synchronizing signal is coupled via the first transformer to synchronize the base current.

18 Claims, 3 Drawing Sheets

SWITCHING POWER SUPPLY

This application is a continuation of an international application, PCT/EP88/00857 filed Sep. 22, 1988, Ser. No. 88/00857, designating the United States and claiming priority from a German Patent Application filed Sep. 30, 1987, Ser. No. P 37 33 456.5.

The invention relates to a switching power supply, particularly for video monitors, television receivers and video recorders.

In switching power supplies it is known to vary a base current of a switching power transistor as a function of a collector current of the transistor during a conduction interval within a given switching cycle. The variation of the base current is such that the base current increases approximately in the same proportion as the increase in the collector current. In this way, improved switching characteristics of the switching power transistor and reduced losses at this transistor are obtained. The base current has been derived from the collector current by means of a first current transformer which down-converts the collector current to form the base current which is considerably smaller. The switching power transistor couples an input supply voltage to a primary winding of a power transformer for energizing the power supply. Output supply voltages are produced from voltages developed at other windings such as a secondary winding of the power transformer.

To provide electrical isolation, the circuits that produce the output supply voltages are isolated from the input supply voltage by the transformer that forms an isolation barrier between the secondary and primary windings. Circuit components, currents and voltages of the power supply that are isolated from the input supply voltage and from the primary winding are referred to herein as being at a secondary side of the power transformer; whereas, those that are non-isolated are referred to herein as being at a primary side.

It is also known in switching power supplies to transform-couple a synchronizing pulse voltage, generated in circuit referenced to the secondary side, to circuits referenced to the primary side. The synchronizing pulse can be at, for example, the horizontal deflection frequency which is generated at the secondary side and which triggers or synchronizes the periodical switching operation of the switching transistor at the primary side. For coupling the pulse voltage, a second transformer has been utilized in order to maintain the isolation with between the secondary side and the primary side. The second transformer which couples the synchronizing pulse from the secondary side to the primary side provides time reference information. It may be desirable to utilize one transformer, instead of the two transformers, for applying both the collector current and the synchronizing pulse voltage from the secondary side to the primary side so as to simplify the power supply.

In accordance with an aspect of the invention, the same transformer is utilized for coupling the collector current to form the base current and for coupling the synchronizing pulse voltage to synchronize the switching operation of the switching power transistor. Transformer-coupling of the collector current, on the one hand, and transformer coupling of the synchronizing pulse voltage, on the other hand, are not carried out simultaneously but successively, or alternately.

During an interval when the switching power transistor is conductive and its collector current is transformer-coupled to form the base current, no synchronizing pulse voltage is transformer-coupled. On the other hand, during an interval when the pulse voltage is transformer-coupled, the switching transistor is turned-off. Consequently, the collector current and the base current are zero. Therefore, the transformer does not transformer-couple the collector current during the interval when the synchronizing pulse voltage is generated. Therefore, during this period, the synchronizing pulse voltage can be transformer-coupled without disturbance. As a result of utilizing the transformer in a time sequential operating mode it is possible to utilize one transformer both as a current transformer, for generating the base current from the collector current, and as an information coupling transformer for synchronizing the switching operation. Such arrangement is particularly advantageous in high performance switching power supplies which operate with differing input voltages and differing frequencies.

In carrying out a feature of the invention, one transformer with, for example, only three windings is used so as to reduce costs. In total, advantageously, only one transformer having one core, one coil carrier and the three windings is required instead of two transformers having a total of two cores, two coil carriers and four windings.

Figure 1:
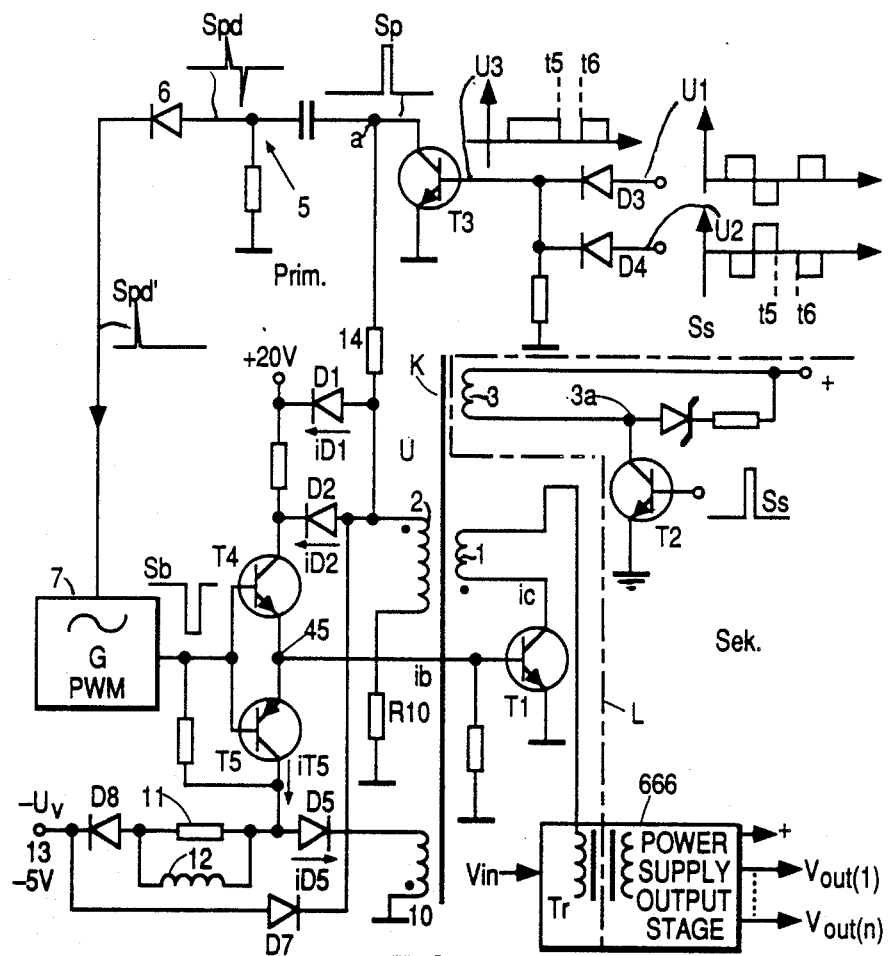
FIG. 1 illustrates a switching power supply embodying an aspect of the invention.

FIG. 1 illustrates a switching power supply embodying an aspect of the invention. The collector of transistor T1 is coupled to a primary winding of a power transformer Tr of an output stage 666 via a winding 1 of a transformer U. Output stage 666 generates output supply voltages at a secondary side Sek of an isolation barrier L using rectifier circuits, not shown, that are coupled in a nonisolated manner to a secondary winding of transformer Tr.

A base current ib that is proportional to a collector current ic is derived from collector ic of transistor T1 by the transformer-coupling operation of transformer U. Transformer U operates, with respect to current ic and ib, similarly to an ideal current transformer. Also, a synchronizing pulse Ss at, for example, the horizontal deflection frequency is applied from secondary side Sek of isolation barrier L to a primary side Prim. The isolation barrier between the secondary side Sek and the primary side Prim is shown by a broken line L.

In carrying out an inventive feature, transformer U is used both for transformer-coupling current ic to form current ib and for transformer-coupling sync pulses Ss. Transformer U has three windings 1, 2 and 3.

In operation, collector current ic, flowing during a given conduction interval of a given switching cycle of transistor T1, flows through windings 1 in an upramping manner and is transformer-coupled to winding 2. Current ic is stepped-down by current transformer U. The smaller or stepped-down current flowing in winding 2 is coupled via a forward biased diode D2 and a junction terminal 45 between transistors T4 and T5 to the base of transistor T1 for supplying a base current ib that turns on transistor T1. Base current ib generated by winding 2 is proportional to collector current ic and also increases in an upramping manner. A diode D1 serves for limiting the voltage at the dotted side of winding 2 the turn off interval of transistor T1.

Sync pulse Ss does not occur when transistor T1 is conductive. Therefore, advantageously, it cannot affect the shape of the base current waveform. A given sync pulse Ss, generated at the secondary side Sek controls a transistor T2, causing it to be conductive. Conductive transistor T2 couples an output voltage + across winding 3 to produce a corresponding pulse voltage in winding 3. This pulse in winding 3 is coupled to winding 2 via transformer U and generates a corresponding sync pulse Sp at primary side Prim which is coupled to a collector of a transistor T3 via a resistor 14.

Transistor T3 operates as a gate to form a time window. Transistor T3 is triggered at its base by push-pull voltages U1 and U2 at opposite polarities having waveforms that are shown in FIG. 1. Voltages U1 and U2 are derived from transformer Tr and coupled via diodes D3 and D4, respectively, to the base of transistor T3. Diodes D3 and D4 operate as an "OR" gate. A voltage U3 results at the base of transistor T3 during an interval t5-t6 which causes transistor T3 to be nonconductive, thereby allows the generation of pulse Sp at the collector. During the rest of the cycle, a terminal "a" at the collector of transistor T3 is short-circuited to ground by transistor T3 for preventing any disturbance signals from being coupled through terminal "a" to the base of transistor T1.

Sync pulse Sp is applied via an R-C differentiator network 5 for producing a bipolar differentiated pulse Spd. Positive pulses Spd' of pulses Spd are coupled via diode 6 to a regulation control circuit 7. Circuit 7 generates a control pulse Sb for controlling the turn-off instant of transistor T1. Control circuit 7 pulse-width modulates collector current ic to provide regulation. The turn-on instant of transistor T5 is determined by pulses Spd'. Pulse Sb controls transistors T5 and T4. Pulse Sb causes transistor T4 to be nonconductive and transistor T5 to be conductive for turning off transistor T1. For the duration of pulse Ss, currents ib and ic are substantially zero and, advantageously, cannot be affected by pulses Ss.

With respect to transformer-coupling current, winding 1 operates as a primary winding and winding 2 operates as a secondary winding. With respect to transformer-coupling sync pulses Ss, winding 3 operates as a primary winding and winding 2 also operates, again, as a secondary winding. Because of this dual function of winding 2, only one transformer is required.

A resistor 11, an inductance 12 and a diode D8 couple a negative voltage −Uv to the collector of transistor T5 for supplying the negative base current required for turning off transistor T1 at a beginning of a turn-off interval of transistor T1. When the collector of transistor T4 becomes zero, at the beginning of the turn-off interval of transistor T1, a current flowing in a winding 10 of transformer U as a result of the stored magnetic energy in transformer U provides additional control of negative base current ib for improving the turn-off of transistor T1 and the switching-off of collector current ic. The winding direction of winding 10 is such that a voltage generated across winding 10 when transistor T4 becomes nonconductive generates a current that is coupled via diode D5 and transistor T5 to produce a negative base current ib for turning-off transistor T1 fast. The amplitude of the negative base current is, advantageously, proportional to the peak value of collector current ic.

Should, for example, a fault condition occur, causing collector current ic to increase significantly, the negative base current produced by winding 10 will also increase that tends to reduce the storage time in transistor T1. Therefore, in accordance with an inventive feature, under such fault condition transistor T1 can be turned off faster by the operation of winding 10 than without it. Consequently, an improved protection for transistor T1 is obtained.

It is the purpose of a diode D7 to recover the stored energy in transformer U for supplying, in part, the energy required from the source of negative voltage −Uv at a terminal 13. Thus, circuit according to FIG. 1 operates as a source of stored energy.

Figure 2:
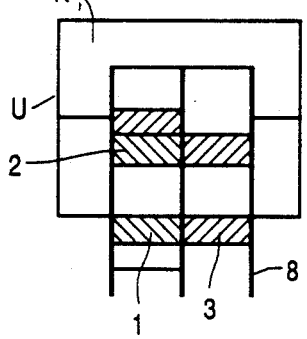
FIG. 2 illustrates the way a transformer used in the arrangement of FIG. 1 is constructed.

FIG. 2 shows the construction of transformer U having a core K and three windings 1, 2 and 3. Separating walls 8 made of plastic material provide the necessary electrical isolation between winding 3, at the secondary side, and windings 1 and 2, at the primary side as wall as the isolation of these windings from core K.

Figure 3:
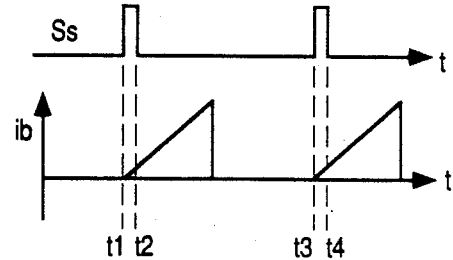
FIG. 3 illustrates waveforms explaining the sequential mode of operation.

FIG. 3 illustrates waveforms showing the time relationship between sync pulse Ss and base current ib. As shown, pulse Ss and current ib substantially do not occur simultaneously but only successively. From time t1 to time t2, sync pulse Ss is transformer coupled. From time t2 and time t3, the waveform of base current ib changes in accordance with collector current ic; whereas, sync pulse Ss is substantially not present.

Figure 4:
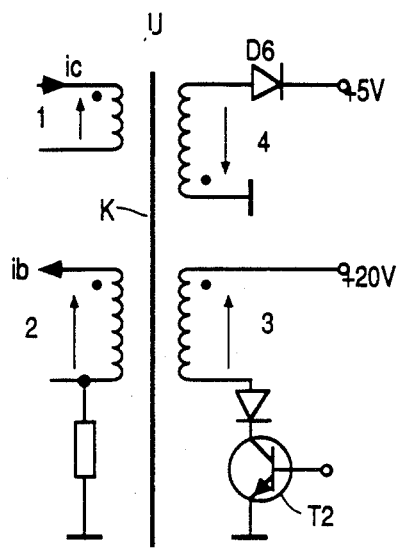
FIG. 4 illustrates a second embodiment of the invention in which the transformer of FIG. 1 has an additional fourth winding.

FIG. 4 illustrates a second embodiment of the invention in which, in addition to the windings 1, 2 and 3 of FIG. 1, a fourth winding 4 is provided. Similar symbols and numerals in FIGS. 1 and 4 indicate similar items or functions. Winding 4 of FIG. 4 is coupled to an output voltage of +5 volts via a diode D6 and serves to demagnetize core K. When the currents in windings 1, 2 and 3 are switched off, a so-called magnetizing current flows through winding 4. Winding 4, as indicated by the dots representing the winding direction in transformer U, is wound in an opposite manner with respect to windings 1, 2 and 3. Winding 4 provides an advantage in that diodes D1 and D2 shown in FIG. 1 are no longer required and it also reduces power.

Figure 5:
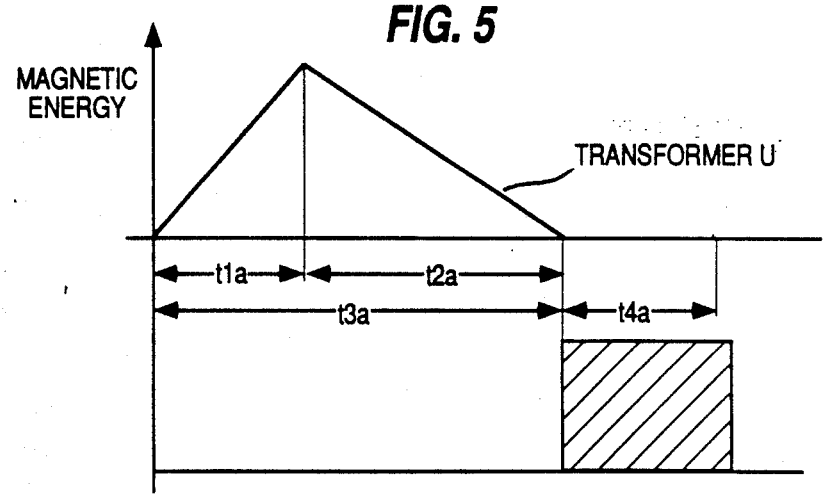
FIG. 5 illustrates waveforms useful for explaining a time window mode of operation.
Figure 6:
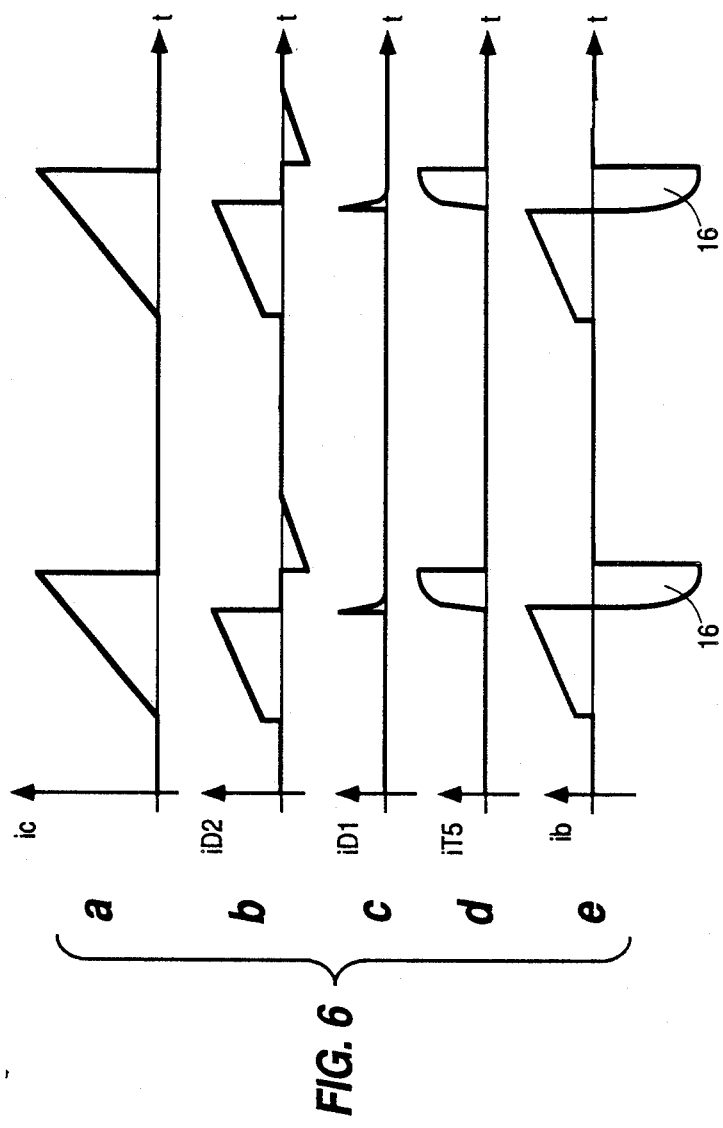
FIG. 6 illustrates waveforms useful for explaining the operation of the circuit of FIG. 1.

FIG. 5 illustrates waveforms useful for explaining the time window mode of operation mentioned before. During an interval t1a, a build-up of magnetic energy in transformer U occurs as a result of upramping collector current ic in primary winding 1. During an interval t2a, the magnetic energy is removed from transformer U via secondary windings 2 and 3 and, in the case of FIG. 4, via winding 4. During an interval t3a=t1a+t2a of FIG. 5, no sync pulse Ss is transformer-coupled to circuit 7 of FIG. 1. During a portion of interval t4a of FIG. 5, forming a time window, the circuit can allow a possible sync pulse Ss of FIG. 1 to pass through. If sync pulse Ss fails to appear, the flow of collector current ic is initiated by the natural oscillation frequency of circuit 7. The time window within interval t4a of FIG. 5 is controlled in the arrangement of FIG. 1 by gate transistor T3.

FIGS. 6a–6e illustrate waveforms of currents of the circuit according to FIG. 1. Similar symbols and numerals in FIGS. 1 and 6a–6e indicate similar items or functions. Collector current ic through transistor T1, a current iD2 through diode D2, a current iD1 through diode D1, a current iT5 through transistor T5, operating as a driver transistor, and base current ib for controlling transistor T1 are shown in FIGS. 6a, 6b, 6c, 6d and 6e, respectively. Current iT5 that turns off transistor T1 is generated by circuit elements 10, 11, 12, D5, D7 and D8. Current iT5 generates a negative pulse 16 in base transistor current ib in accordance with current amplification of transistor T5. The negative peak of pulse 16 in base current ib causes the above mentioned improvement in the turning-off of transistor T1. Because of the peak of pulse 16 is generated in winding 10, the amplitude of peak pulse 16 of negative base current ib is proportional to collector current ic, as it is desired.

What is claimed is:

1. A switching power supply, comprising:
   a first transformer;
   switching means having a main current conducting terminal that is coupled to a first winding of said transformer for generating a periodic first current in said main current conductive terminal that varies when said switching means is conductive and that is transformer-coupled via said transformer;
   means responsive to said transformer-coupled first current and coupled to a control terminal of said switching means for generating a control signal at said control terminal that varies when said switching means is conductive, in accordance with the variation of said first current, such that the variation in said control signal compensates in said switching means for the variation in said first current;
   a source of a synchronizing signal;
   means responsive to said synchronizing signal and coupled to a winding of said transformer for transformer-coupling said synchronizing signal via signal transformer to said control signal generating means to synchronize said control signal; and
   means coupled to said first winding and energized by said first current for generating therefrom an output supply voltage.

2. A power supply according to claim 1 further comprising, means for decoupling said synchronizing signal from said first control signal generating means to prevent said synchronizing signal from affecting said first control signal when said switching means is conductive.

3. A power supply according to claim 1 wherein said switching means comprises a switching power transistor, wherein said first current flows in a collector electrode of said transistor in a ramping manner and is transformer-coupled via said transformer to a base electrode of said transistor to produce a ramping base current such that a slope of said current is applied to said base electrode by the transformer-coupling said base current.

4. A power supply according to claim 1 where said output supply voltage generating means comprises a power, second transformer having a winding that is coupled in a current path of said first current such that said first current energizes said second transformer.

5. A power supply according to claim 4 further comprising, means for generating a second control signal that is indicative when, during said given period of said first current, said second transformer is not energized and means for coupling said synchronizing signal to said first control signal generating means via said first transformer when said second transformer is not energized and for decoupling said synchronizing signal from said first control signal generating means when said second transformer is energized.

6. A switching power supply, comprising:
   a first transformer having a plurality of windings;
   first switching transistor having a collector electrode that is coupled to a first winding of said plurality for generating in said first winding and in said collector electrode a periodic ramping first current that is transformed-coupled from said first winding via said transformer;
   means responsive to said transformer-coupled first current for generating a base current in said transistor in accordance with said transformer-coupled first current such that a slope of a base current of said transistor is caused by a slope of said ramping first current;
   a source of a synchronizing signal;
   means coupled to a winding of said plurality for transformer-coupling said synchronizing signal via said transformer to said base current generating means to synchronize said base current to said synchronizing signal; and
   means coupled to said first winding and energized by said first current for generating therefrom an output supply voltage.

7. A switching power supply, comprising:
   a first transformer having first, second and third windings;
   a first switching transistor having a collector electrode that is coupled to said first winding for generating in said first winding and in said collector electrode a periodic first current that is transformer-coupled from said first winding to said second winding for supplying from said transformer-coupled first current a base current of said transistor;
   a source of a synchronizing signal coupled to said third winding for transformer-coupling said synchronizing signal to said second winding of said transformer;
   means responsive to said transformer-coupled synchronizing signal in said second winding and coupled to said transistor for controlling the timing of said transistor in accordance with said synchronizing signal; and
   means coupled to said first winding and energized by said first current for generating therefrom an output supply voltage.

8. A switching power supply, comprising:
   a power transformer having a barrier that defines a primary side and a secondary side for generating an output supply voltage;
   a switching transistor coupled to a winding of said power transformer referenced to said primary side of said power transformer for generating a periodic collector current that energizes said power transformer;
   a second transformer having a first winding that is coupled in a current path of said collector current and having a second winding that is coupled in a current path of a base electrode of said transistor and that is referenced to said primary side for transformer-coupling said collector current to said base electrode to supply from said transformer-coupled collector current a base current of said transistor; and
   means for generating a synchronizing signal coupled to a third winding of said second transformer for transformer-coupling said synchronizing signal from said third winding, that is referenced to said secondary side, to said primary side referenced second winding of said second transformer; and means responsive to said transformer-coupled sychronizing signal at said second winding for generating a control signal that is coupled to said transistor for controlling the timings of said transistor in accordance with said synchronizing signal.

9. A switching power supply according to claim 8 wherein when said switching transistor is conductive, a change in a magnitude of said collector current produces a corresponding change in a magnitude of said base current.

10. A power supply according to claim 8 wherein said synchronizing signal controls the periodical turn-on of the switching transistor.

11. A power supply according to claim 7 further comprising, a gate coupled in a path of said synchronizing signal at said primary side that serves as a time window and that is nonconductive during a duration of a given pulse of said synchronizing signal.

12. A power supply according to claim 8 wherein said second transformer includes a fourth winding for generating a current that demagnetizes a core of said second transformer.

13. A power supply according to claim 12, wherein said fourth winding is coupled to an operating voltage via a diode.

14. A switching power supply, comprising:
a transformer;
a switching transistor having a collector electrode that is coupled to a first winding of said transformer to produce a periodic collector current of said transistor in a current path that includes said first winding, and a base electrode that is coupled to a second winding of said transformer to form with said second winding a second current path of a base current of said transistor such that said collector current is transformer-coupled to said second winding to supply said base current from said transformer-coupled collector current; and a source of a synchronizing signal coupled to a third winding of said transformer for transformer-coupling said synchronizing signal to a utilization circuit via said transformer such that said third winding is in one side of a barrier of said transformer and said second winding is on the other side of said barrier.

15. A power supply according to claim 14 wherein said utilization circuit comprises means for producing a control signal that is coupled to said electrode for controlling at least one of turn-on and a turn-off instant of said transistor in accordance with said synchronizing signal.

16. A switching power supply, comprising:
a first transformer having a plurality of windings;
a first switching transistor having a collector electrode that is coupled to a first winding of said plurality for generating in said first winding and in said collector electrode a periodic first current that is transformer-coupled from said first winding to a second winding of said plurality for generating a second current in a current path that includes said second winding when said transistor is conductive;
switching means for decoupling said second winding from said current path and for, instead, coupling a winding of said plurality to a base electrode of said transistor to supply from a magnetic energy that has been stored in said transformer by said second current a base current at a first polarity that causes said switching transistor to turn-off fast; and
means for generating a base current at an opposite polarity that causes said transistor to be conductive, during a portion of a given switching cycle.

17. A power supply according to claim 16 wherein said second current supplies said base current when said transistor is conductive.

18. A power supply according to claim 16 wherein said winding in which said base current at said first polarity is produced is separate from said second winding.

* * * * *

UNITED STATES PATENT AND TRADEMARK OFFICE
CERTIFICATE OF CORRECTION

PATENT NO.   :   4,987,525

DATED        :   January 22, 1991

INVENTOR(S)  :   GERARD RILLY and DANIEL LOPEZ

It is certified that error appears in the above-identified patent and that said Letters Patent is hereby corrected as shown below:

Col. 5, lines 37-38     delete "signal" (second occurrence), and insert -- said --;

Col. 5, line 54         before "current" insert -- first --;

Col. 5, line 56         delete "where" and insert -- wherein --.

Signed and Sealed this

Thirtieth Day of June, 1992

Attest:

DOUGLAS B. COMER

Attesting Officer     Acting Commissioner of Patents and Trademarks